United States Patent
Ostwald et al.

(10) Patent No.: US 9,400,969 B2
(45) Date of Patent: Jul. 26, 2016

(54) TARGET DECODING AND ROBOT POSITIONING IN A STORAGE LIBRARY

(71) Applicant: Oracle International Corporation, Redwood City, CA (US)

(72) Inventors: Timothy Craig Ostwald, Boulder, CO (US); Terry L. Lane, Broomfield, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 365 days.

(21) Appl. No.: 14/036,346

(22) Filed: Sep. 25, 2013

(65) Prior Publication Data
US 2015/0083794 A1    Mar. 26, 2015

(51) Int. Cl.
| | |
|---|---|
| *G06F 17/00* | (2006.01) |
| *G06K 7/10* | (2006.01) |
| *G06K 7/14* | (2006.01) |
| *G06Q 10/08* | (2012.01) |
| *G06K 9/32* | (2006.01) |
| *G07F 11/16* | (2006.01) |

(52) U.S. Cl.
CPC ............ *G06Q 10/087* (2013.01); *G06K 9/3216* (2013.01); *G06K 2009/3225* (2013.01); *G07F 11/165* (2013.01)

(58) Field of Classification Search
CPC . G06K 7/10861; G06K 7/10544; G06K 7/14; G06K 7/10722; G06K 9/3216; G06K 2009/3225; G06Q 10/087; G07F 11/165

USPC ................. 235/375, 462.01–462.49
See application file for complete search history.

(56) References Cited

U.S. PATENT DOCUMENTS

| | | | | |
|---|---|---|---|---|
| 5,739,518 | A * | 4/1998 | Wang ................ | G06K 7/10871 235/462.09 |
| 7,428,995 | B1 * | 9/2008 | Stern ................. | G06K 7/10742 235/462.01 |
| 2008/0121727 | A1 * | 5/2008 | Iftime ...................... | G06K 1/12 235/494 |
| 2011/0240742 | A1 * | 10/2011 | Li ........................ | G06K 7/1443 235/462.11 |

* cited by examiner

*Primary Examiner* — Laura Gudorf
(74) *Attorney, Agent, or Firm* — Marsh Fischmann & Breyfogle LLP; Daniel J. Sherwinter

(57) ABSTRACT

Systems and methods are described for automatic calibration of robotic mechanism functions according to accurate decoding and locating of target features using spot scanning. For example, a robotic mechanism in a storage library has one or more integrated scanners that can acquire contrast and/or topographic scan data from a scan window that represents a profile of the scan window expected to have one or more target feature sets. The scan data can be decoded according to predefined target masks (e.g., target type-specific fit tables) at a number of decode threshold levels to estimate target feature values, which can be used to converge on (or otherwise generate) a purported target definition with purported feature values. The purported target definition can be used to facilitate various functions, such as automatic calibration of robotic mechanism positioning and object identification.

18 Claims, 14 Drawing Sheets visionUserTarget.Init() - Profile Selection, targetType=Magazine, scanDir=Horiz, targetProfile=Normal
visionUserTarget.IsTarget() - Target Found. Run-lengths (mils): 138.65,195.31,195.31,165.55; TargetWidth:195.31, Offset:-13, numDecodes=1
visionUserTarget.IsTarget() - 1 Targets Found, run length reached
visionUserTarget.IsTarget() - Target Found. Run-lengths (mils): 141.18,187.71,187.71,170.62; TargetWidth:187.71, Offset:-14, numDecodes=3
visionUserTarget.IsTarget() - 1 Targets Found, run length reached
visionUserTarget.IsTarget() - Target Found. Run-lengths (mils): 143.39,180.11,180.11,176.00; TargetWidth:180.11, Offset:-16, numDecodes=6
visionUserTarget.IsTarget() - 1 Targets Found, run length reached
visionUserTarget.IsTarget() - Target Found. Run-lengths (mils): 145.61,172.52,172.52,181.38; TargetWidth:172.52, Offset:-18, numDecodes=10
visionUserTarget.IsTarget() - 1 Targets Found, run length reached
visionUserTarget.IsTarget() - Target Found. Run-lengths (mils): 158.59,141.18,141.18,199.74; TargetWidth:141.18, Offset:-20, numDecodes=56
visionUserTarget.IsTarget() - 1 Targets Found, run length reached
visionUserTarget.IsTarget() - Target Found. Run-lengths (mils): 159.22,140.23,140.23,200.06; TargetWidth:140.23, Offset:-20, numDecodes=58
visionUserTarget.IsTarget() - 1 Targets Found, run length reached
visionUserTarget.IsTarget() - Target Found. Run-lengths (mils): 160.17,138.65,138.65,200.69; TargetWidth:138.65, Offset:-20, numDecodes=61
visionUserTarget.IsTarget() - 1 Targets Found, run length reached
visionUserTarget.IsTarget() - Target Found. Run-lengths (mils): 160.80,137.38,137.38,201.32; TargetWidth:137.38, Offset:-20, numDecodes=63
visionUserTarget.IsTarget() - 1 Targets Found, run length reached
visionUserTarget.IsTarget() - No Target Found in full Run Length at AmpThreshold=705.98. First 5 run-lengths (pts): 508,319,11,104,636
visionUserTarget.IsTarget() - No Target Found in full Run Length at AmpThreshold=721.98. First 5 run-lengths (pts): 527,127,241,29,654
visionUserTarget.IsTarget() - No Target Found in full Run Length at AmpThreshold=723.98. First 5 run-lengths (pts): 530,119,252,19,658
visionUserTarget.IsTarget() - No Target Found in full Run Length at AmpThreshold=725.98. First 5 run-lengths (pts): 535,107,936,9,661

FIG. 6A

NumThresholds=95, NumDecodes=63, BestDecode=37, MaxGroupNum=1 BestGroupNum=1
Group 1: decodeCount=63
Decode 0: Width=195.31mils, AmpThreshold=1.947V, Offset=-13mils, OffsetGroupNum=1
Decode 1: Width=191.19mils, AmpThreshold=1.950V, Offset=-13mils, OffsetGroupNum=1
Decode 2: Width=187.71mils, AmpThreshold=1.953V, Offset=-14mils, OffsetGroupNum=1
Decode 3: Width=184.86mils, AmpThreshold=1.956V, Offset=-15mils, OffsetGroupNum=1
Decode 4: Width=182.33mils, AmpThreshold=1.959V, Offset=-15mils, OffsetGroupNum=1
Decode 5: Width=180.11mils, AmpThreshold=1.962V, Offset=-16mils, OffsetGroupNum=1
Decode 6: Width=177.90mils, AmpThreshold=1.965V, Offset=-16mils, OffsetGroupNum=1
Decode 7: Width=176.00mils, AmpThreshold=1.968V, Offset=-17mils, OffsetGroupNum=1
Decode 8: Width=174.42mils, AmpThreshold=1.971V, Offset=-17mils, OffsetGroupNum=1
Decode 9: Width=172.52mils, AmpThreshold=1.974V, Offset=-18mils, OffsetGroupNum=1
Decode 10: Width=170.93mils, AmpThreshold=1.977V, Offset=-18mils, OffsetGroupNum=1
Decode 34: Width=151.62mils, AmpThreshold=2.049V, Offset=-20mils, OffsetGroupNum=1
Decode 35: Width=150.99mils, AmpThreshold=2.052V, Offset=-20mils, OffsetGroupNum=1
Decode 36: Width=150.36mils, AmpThreshold=2.056V, Offset=-20mils, OffsetGroupNum=1
Decode 37: Width=149.73mils, AmpThreshold=2.059V, Offset=-20mils, OffsetGroupNum=1
Decode 48: Width=144.66mils, AmpThreshold=2.092V, Offset=-20mils, OffsetGroupNum=1
Decode 49: Width=144.03mils, AmpThreshold=2.095V, Offset=-20mils, OffsetGroupNum=1
Decode 50: Width=143.39mils, AmpThreshold=2.098V, Offset=-20mils, OffsetGroupNum=1
Decode 51: Width=142.76mils, AmpThreshold=2.101V, Offset=-20mils, OffsetGroupNum=1
Decode 52: Width=142.76mils, AmpThreshold=2.104V, Offset=-20mils, OffsetGroupNum=1
Decode 61: Width=138.01mils, AmpThreshold=2.131V, Offset=-20mils, OffsetGroupNum=1
Decode 62: Width=137.38mils, AmpThreshold=2.134V, Offset=-20mils, OffsetGroupNum=1
tgtMidptNomLen=150mils, AmpMin(min)=1.937V, AmpMax=2.228V, AmpDelta=0.291V, AmpMean=2.012V
MinAmpThreshold=1.947V Width=195.31mils, MaxAmpThreshold=2.134V Width=137.38mils ThresholdDelta=0.188V
Best AmpThreshold=2.059V Width=149.73mils Offset=-20mils

FIG. 6B

Decoded Target Thresholds:
NumThresholds=185, NumDecodes=93, BestDecode=35, MaxGroupNum=2 BestGroupNum=1
Group 1: decodeCount=64
Group 2: decodeCount=29
Decode 0: Width=174.43mils, AmpThreshold=1.856V, Offset=74mils, OffsetGroupNum=1
Decode 1: Width=178.54mils, AmpThreshold=1.859V, Offset=74mils, OffsetGroupNum=1
Decode 2: Width=180.12mils, AmpThreshold=1.862V, Offset=75mils, OffsetGroupNum=1
Decode 3: Width=181.70mils, AmpThreshold=1.865V, Offset=75mils, OffsetGroupNum=1
Decode 4: Width=182.65mils, AmpThreshold=1.868V, Offset=76mils, OffsetGroupNum=1
Decode 33: Width=199.08mils, AmpThreshold=1.956V, Offset=78mils, OffsetGroupNum=1
Decode 34: Width=199.40mils, AmpThreshold=1.959V, Offset=78mils, OffsetGroupNum=1
Decode 35: Width=200.03mils, AmpThreshold=1.962V, Offset=78mils, OffsetGroupNum=1
Decode 36: Width=200.34mils, AmpThreshold=1.965V, Offset=79mils, OffsetGroupNum=1
Decode 61: Width=212.98mils, AmpThreshold=2.041V, Offset=83mils, OffsetGroupNum=1
Decode 62: Width=214.88mils, AmpThreshold=2.044V, Offset=83mils, OffsetGroupNum=1
Decode 63: Width=216.14mils, AmpThreshold=2.047V, Offset=84mils, OffsetGroupNum=1
Decode 64: Width=217.72mils, AmpThreshold=2.050V, Offset=85mils, OffsetGroupNum=2
Decode 65: Width=218.99mils, AmpThreshold=2.053V, Offset=85mils, OffsetGroupNum=2
Decode 66: Width=220.25mils, AmpThreshold=2.056V, Offset=85mils, OffsetGroupNum=2
Decode 67: Width=222.15mils, AmpThreshold=2.059V, Offset=86mils, OffsetGroupNum=2
Decode 88: Width=236.68mils, AmpThreshold=2.122V, Offset=90mils, OffsetGroupNum=2
Decode 89: Width=237.00mils, AmpThreshold=2.126V, Offset=90mils, OffsetGroupNum=2
Decode 90: Width=237.63mils, AmpThreshold=2.129V, Offset=90mils, OffsetGroupNum=2
Decode 91: Width=237.95mils, AmpThreshold=2.132V, Offset=90mils, OffsetGroupNum=2
Decode 92: Width=238.58mils, AmpThreshold=2.135V, Offset=90mils, OffsetGroupNum=2 tgtMidptNomLen=200mils, AmpMin(min)=1.852V, AmpMax=2.414V, AmpDelta=0.561V, AmpMean=2.010V
MinAmpThreshold=1.856V Width=174.43mils, MaxAmpThreshold=2.135V Width=238.58mils ThresholdDelta=0.279V
Best AmpThreshold=1.962V Width=200.03mils Offset=78mils
Profile Used: Re-Attempt

FIG. 9

NumThresholds=191, NumDecodes=66, BestDecode=62, MaxGroupNum=2 BestGroupNum=2
Group 1: decodeCount=6
Group 2: decodeCount=60
Decode 0: Width=105.86mils, AmpThreshold=2.218V, Offset=-123mils, OffsetGroupNum=1
Decode 1: Width=99.86mils, AmpThreshold=2.221V, Offset=-122mils, OffsetGroupNum=1
Decode 2: Width=93.85mils, AmpThreshold=2.224V, Offset=-121mils, OffsetGroupNum=1
Decode 3: Width=109.97mils, AmpThreshold=2.224V, Offset=-108mils, OffsetGroupNum=2
Decode 4: Width=87.53mils, AmpThreshold=2.227V, Offset=-120mils, OffsetGroupNum=1
Decode 5: Width=109.65mils, AmpThreshold=2.227V, Offset=-108mils, OffsetGroupNum=2
Decode 6: Width=80.58mils, AmpThreshold=2.230V, Offset=-118mils, OffsetGroupNum=1
Decode 7: Width=109.65mils, AmpThreshold=2.230V, Offset=-108mils, OffsetGroupNum=2
Decode 8: Width=74.89mils, AmpThreshold=2.233V, Offset=-116mils, OffsetGroupNum=1
Decode 9: Width=109.34mils, AmpThreshold=2.233V, Offset=-108mils, OffsetGroupNum=2
Decode 10: Width=109.02mils, AmpThreshold=2.236V, Offset=-108mils, OffsetGroupNum=2
Decode 11: Width=109.02mils, AmpThreshold=2.239V, Offset=-108mils, OffsetGroupNum=2
Decode 12: Width=108.70mils, AmpThreshold=2.242V, Offset=-108mils, OffsetGroupNum=2
Decode 13: Width=108.39mils, AmpThreshold=2.245V, Offset=-108mils, OffsetGroupNum=2
Decode 14: Width=108.07mils, AmpThreshold=2.248V, Offset=-108mils, OffsetGroupNum=2
Decode 15: Width=108.07mils, AmpThreshold=2.251V, Offset=-108mils, OffsetGroupNum=2
..........
Decode 59: Width=98.91mils, AmpThreshold=2.384V, Offset=-108mils, OffsetGroupNum=2
Decode 60: Width=98.91mils, AmpThreshold=2.387V, Offset=-108mils, OffsetGroupNum=2
Decode 61: Width=98.91mils, AmpThreshold=2.390V, Offset=-108mils, OffsetGroupNum=2
Decode 62: Width=98.28mils, AmpThreshold=2.393V, Offset=-108mils, OffsetGroupNum=2
Decode 63: Width=98.28mils, AmpThreshold=2.396V, Offset=-108mils, OffsetGroupNum=2
Decode 64: Width=98.28mils, AmpThreshold=2.399V, Offset=-108mils, OffsetGroupNum=2
Decode 65: Width=98.28mils, AmpThreshold=2.402V, Offset=-108mils, OffsetGroupNum=2
tgtMidptNomLen=90mils, AmpMin(min)=2.102V, AmpMax=2.684V, AmpDelta=0.582V, AmpMean=2.293V
MinAmpThreshold=2.218V Width=105.86mils, MaxAmpThreshold=2.402V Width=98.28mils ThresholdDelta=0.185V
Best AmpThreshold=2.393V Width=98.28mils Offset=108mils

FIG. 12

TARGET DECODING AND ROBOT POSITIONING IN A STORAGE LIBRARY

FIELD

Embodiments relate generally to data storage systems, and, more particularly, to use of spot scanners for targeting, location, symbol recognition, and/or the like in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

Operation of the robotic mechanism in the context of a data storage system, typically involves a number of different location related tasks. For example, the robotic mechanism may be used for targeting of specific locations within the data storage system, for performing pick and place operations on media cartridges, for reading barcodes and/or other symbols or features, for auditing the existence and/or absence of media cartridges in magazines or drives, etc. Each of these and other operations can be frustrated when location-related errors are introduced into the environment, if proper corrective feedback is not provided. For example, errors can easily be introduced into the system from physical jarring or manipulation of components, from compounding of errors inherent in electronic components, etc.

Many different techniques are used in an attempt to account for these errors and to accurately locate, or determine the location of, the robotic mechanism or its constituent features in the context of the storage library. Various implementations use stepper motors, physical stops, electromechanical sensors, electro-optical sensors, and/or other techniques. For example, the carriage may move until it detects via one or more sensors that it has reached a desired location. Traditional implementations use a number of different sensors and other location and feedback techniques to provide all the different functionality desired from the robotic mechanism, including scanning and location-related tasks. This may involve integrating large numbers of components, which can add complexity, cost, and weight, while also potentially increasing the rate of failure.

BRIEF SUMMARY

Among other things, systems and methods are described for automatic calibration of robotic mechanism functions according to accurate decoding and locating of target features using spot scanning. Some embodiments operate in context of a data storage library having a robotic mechanism that finds, picks, and places media cartridges in magazines and/or media drives. For example, the robotic mechanism has one or more integrated scanners that can be used to acquire contrast and/or topographic data representing a profile of a region that includes one or more purported target feature sets. The scan data can be decoded according to predefined target masks (e.g., target type-specific fit tables) at a number of decode levels to estimate target feature values, which can be used to converge on (or otherwise generate) a purported target definition with purported feature values. The purported target definition can be used to facilitate various functions, such as automatic calibration of robotic mechanism positioning and object identification.

According to one set of embodiments, a method is provided for target decoding in a data storage system. The method includes: identifying a candidate target region as including an expected target feature set; receiving raw scan data by scanning the candidate target region with a scanner, the raw scan data including a measured level for each of a number of sample locations within the candidate target region; determining, for each of a number of decode threshold levels, an estimated feature value corresponding to each of a set of candidate target features defined by a candidate decode mask; generating a purported target definition by calculating a purported feature value for each of the set of candidate target features as a function of the estimated feature values determined with respect to at least some of the decode threshold levels; and determining whether at least a portion of the expected target feature set is physically present in the candidate target region according to the purported target definition.

According to another set of embodiments, a system is provided for target decoding in a data storage system. The system includes a scanner and at least one processor. The scanner operates to acquire raw scan data indicating a measured level at each of a number of sample locations within a candidate target region determined to include an expected target feature set. The at least one processor is in communication with the spot scanner and operates to: determine, for each of a number of decode threshold levels, an estimated feature value corresponding to each of a set of candidate target features defined by a candidate decode mask; generate a purported target definition by calculating a purported feature value for each of the set of candidate target features as a function of the estimated feature values determined with respect to at least some of the decode threshold levels; and determine whether at least a portion of the expected target feature set is physically present in the candidate target region according to the purported target definition.

BRIEF DESCRIPTION OF THE DRAWINGS

The present disclosure is described in conjunction with the appended figures:

FIGS. 6A and 6B show partial decode results from an illustrative decode module for the positive geometric target shown in FIG. 3, according to various embodiments;

FIG. 9 shows partial decode results from an illustrative decode module for the negative geometric target shown in FIG. 8, according to various embodiments;

FIG. 12 shows a partial set of decode results for the scan data of FIG. 11, in which multiple potential target feature sets can be identified at each decode threshold level, and voting can be used to select the most likely valid target from the target feature sets.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

In many contexts, robotic mechanisms are used to locate and/or identify objects and to perform other related functions. For example, some enterprises use library systems to efficiently store and retrieve data from storage media, like data cartridges (e.g., tape cartridges), that can be stored and indexed in the library within a set of magazines. When particular data is requested, a specialized robotic mechanism finds the appropriate cartridge, removes the cartridge from its magazine, and carries the cartridge to a drive that is designed to receive the cartridge and read its contents. Similarly, the robotic mechanism may be used for targeting of specific locations within the data storage system, for reading barcodes and/or other symbols or features, for auditing the existence and/or absence of media cartridges in magazines or drives, etc. In many implementations, scanners (e.g., optical spot scanners, barcode readers, and the like) can be used to assist with the various location, identification, and other tasks of the robotic mechanism.

Figure 1:
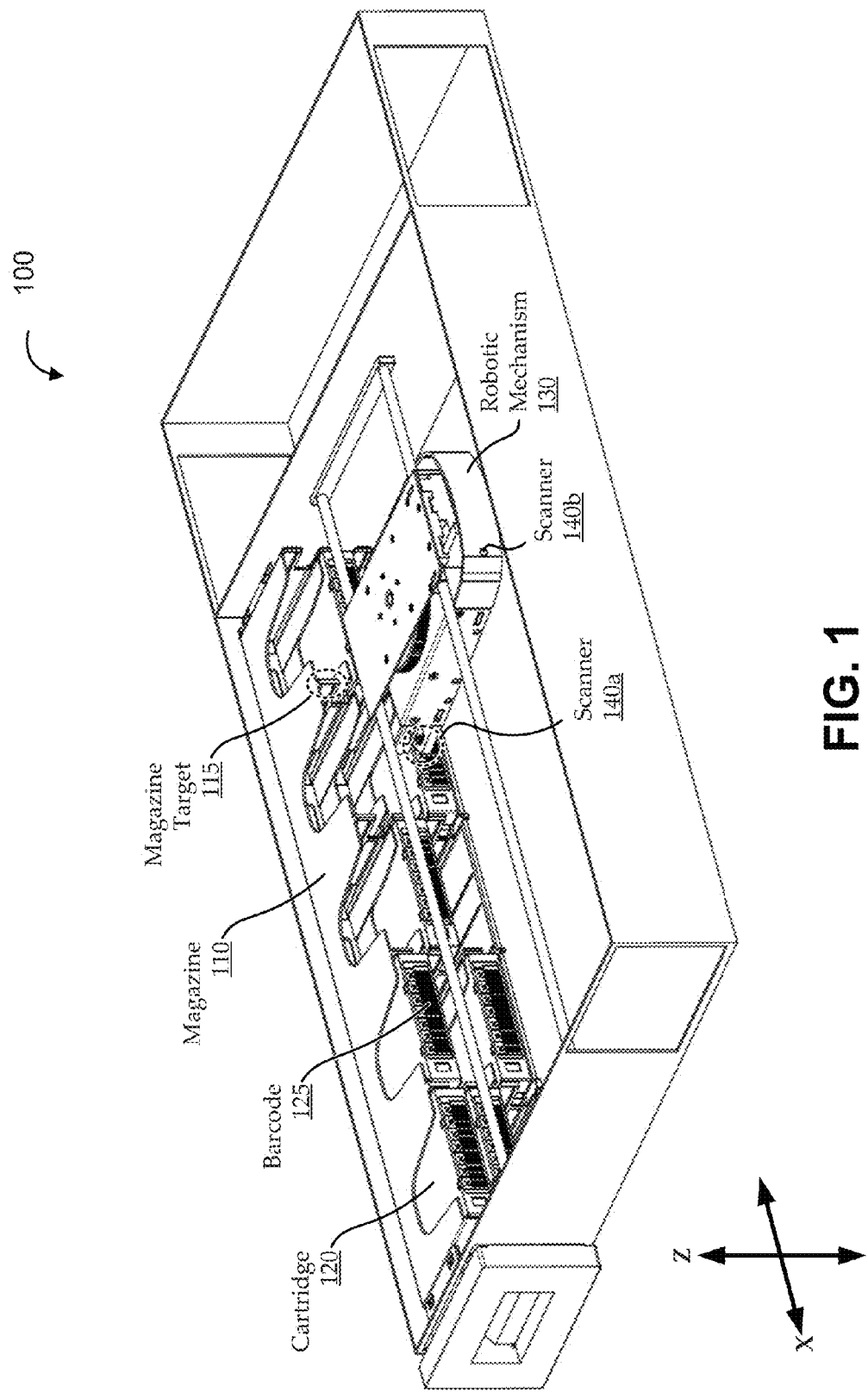
FIG. 1 shows an illustrative storage module for a tape storage library to provide a context for certain embodiments.

For the sake of context, FIG. 1 shows an illustrative storage module 100 for a tape storage library. Such a storage library context is used herein to add clarity to the description. However, such context is not intended to be limiting, as it will be appreciated that the same or similar techniques can be used in many other contexts. The storage module 100 includes a magazine 110 that houses a number of media cartridges 120 in slots. As illustrated, a robotic mechanism 130 operates to move around the storage module 100 to perform pick-and-place operations, locations and auditing operations, etc. In one implementation, the robotic mechanism 130 can move in an X direction on rails and in a Z direction on a cable and pulley system (not shown); the robotic mechanism 130 can reach out in a Y direction using a hand assembly (e.g., a cartridge gripper mechanism); and the robotic mechanism 130 can pivot around the Z axis using a wrist mechanism. In some embodiments, the robotic mechanism 130 includes one or more scanners 140. The scanners 140 can be implemented as spot scanners (e.g., vertical-cavity surface-emitting lasers, or VCSELs), as line scanners (e.g., barcode scanners), or in any other suitable manner. For example, the scanners 140 can be integrated with the robotic mechanism 130, so that the scanners 140 can be pointed, moved, etc. by positioning the robotic mechanism 130. Such functionality is described in context of particular types of scanners and particular types of storage libraries in U.S. patent application Ser. No. 13/366,384, titled "TOPOGRAPHIC SPOT SCANNING FOR A STORAGE LIBRARY," and U.S. patent application Ser. No. 13/408,132, titled "CONTRAST SPOT SCANNING FOR A STORAGE LIBRARY," the disclosures of both of which are fully incorporated herein by reference.

As described herein, the scanners 140 can be used to locate and identify various types of "targets" as predefined sets of target features. For example, targets can include three-dimensional "positive" geometric targets (e.g., a structural element jutting out toward the scanner), three-dimensional "negative" geometric targets (e.g., a hole or absence of structure with reference to the scanner position), three-dimensional pattern targets (e.g., a pattern of positive and negative geometric features of particular dimension and spacing), two-dimensional pattern targets (e.g., a barcode or set of contrasting elements), or any other suitable type of target. For the sake of illustration, the media cartridges 120 are shows as having barcode 125 labels, and the magazine 110 is shown as having various structural features designed to be used as magazine targets 115. The scanners 140 can effectively acquire contrast and/or topographic data representing a profile of a region that includes one or more purported target feature sets. The scan data can be decoded according to predefined target decode masks (e.g., target type-specific fit tables), which can be used to estimate various target features and to converge on (or otherwise generate) a purported target definition with purported feature values. The purported target definition can be used to facilitate various functions, such as automatic calibration of robotic mechanism positioning and object identification.

Figure 2:
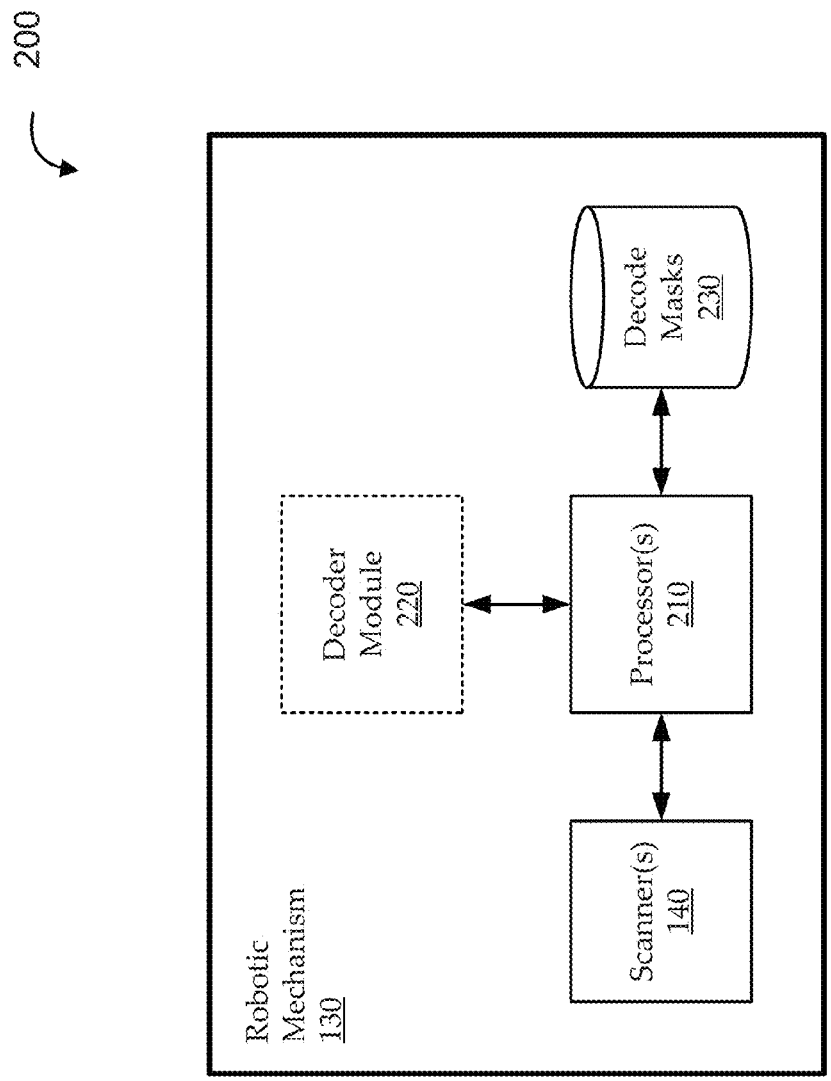
FIG. 2 shows a functional block diagram of an illustrative robotic mechanism having one or more scanners for use in locating the robotic mechanism, identifying and/or locating targets, and/or performing other functions, according to various embodiments.

FIG. 2 shows a functional block diagram 200 of an illustrative robotic mechanism 130 having one or more scanners 140 for use in locating the robotic mechanism 130, identifying and/or locating targets, and/or performing other functions, according to various embodiments. The robotic mechanism 130 includes one or more processors 210, one or more scanners 140, and non-transient storage for storing decode masks 230. Some embodiments of the processor 210 include, implement, or are in communication with a decoder module 220. The various components of the robotic mechanism 130 can all be integrated into a single robotic assembly or can be distributed across multiple assemblies. For example, certain embodiments of the robotic mechanism 130 are implemented as part of a hand assembly that operates to pick and place cartridges in a tape storage library. In such embodiments, the scanners 140 may be physically integrated with the robotic mechanism 130, while the processors 210 and storage may be remote from the robotic mechanism 130 (e.g., in a central computational portion of the storage library).

The various components of the robotic mechanism 110 can be implemented in hardware and/or software, according to various embodiments. For example, the processor 210 can be a central processing unit (CPU) or other type of general or application-specific processor, and the functionality of certain components (e.g., the decoder module 220) can be implemented as instructions (e.g., software, firmware, etc.) that cause the processor 210, when executed, to implement respective functionality. The storage for the decode masks 230 can be any suitable non-transient storage, such as random access memory (RAM), read only memory (ROM), flash memory, EPROM memory, EEPROM memory, registers, hard disks, removable disks, etc. The storage can be in communication with the processor 210 and/or integral to the processor 210. In some implementations, functions are performed by software as one or more instructions which can be distributed over one or more different code segments, among different programs, across multiple storage media, and/or in any suitable manner. For example, certain decode functionality described herein can be implemented as a computer program product stored in a non-transient computer-readable tangible medium as instructions executable by the processor 210 to cause the processor 210 to perform such functionality.

In some embodiments, the scanners 140 acquire raw scan data over a scan region. For example, the robotic mechanism 130 moves to a region of interest in a storage library where a target or set of targets (i.e., an expected target feature set) is expected to be present. As described above, the scanners 140 can be implemented in any suitable manner and can acquire scan data in any suitable manner. For example, a spot scanner can be swept across a scan window to acquire data at each of a number of sample locations. The raw scan data can include an analog level at each of a number of sample locations, and the scan data at each sample location may typically represent a voltage or current level produced by the scanner 140 in response to detecting an environmental condition (e.g., the scanner 140 generates a voltage level corresponding to an amount of reflected or scattered light received by the scanner). For example, the amount of received light by the scanner 140 at each sample location can correspond to the scanned location being a certain distance from the scanner, a certain color, a certain material, etc. While embodiments are described with reference to an optical scanner detecting topographic and/or contrast target feature sets, similar or identical techniques can be applied to other contexts, such as using a magnetic scanner to detect a magnetically varying scan region as a target feature set, a temperature scanner to detect a thermally varying scan region as a target feature set, or the like, without departing from the scope of embodiments.

Having acquired raw scan data from the scan window, the processor 210 can perform various functions, including decoding the data using the decoder module 220. For example, the decoder module 220 attempts to fit the scan data to one of the stored decode masks 230 to generate a purported target definition of one or more targets in the scan region. The purported target definition can be used to perform various types of functions. Certain embodiments determine whether at least a portion of the expected target feature set is physically present in the candidate target region according to the purported target definition. Other embodiments use the purported target definition to validate and/or adjust the location of the robotic mechanism 130, to locate and/or identify targets (e.g., two- and/or three-dimensional features), etc.

Figure 3:
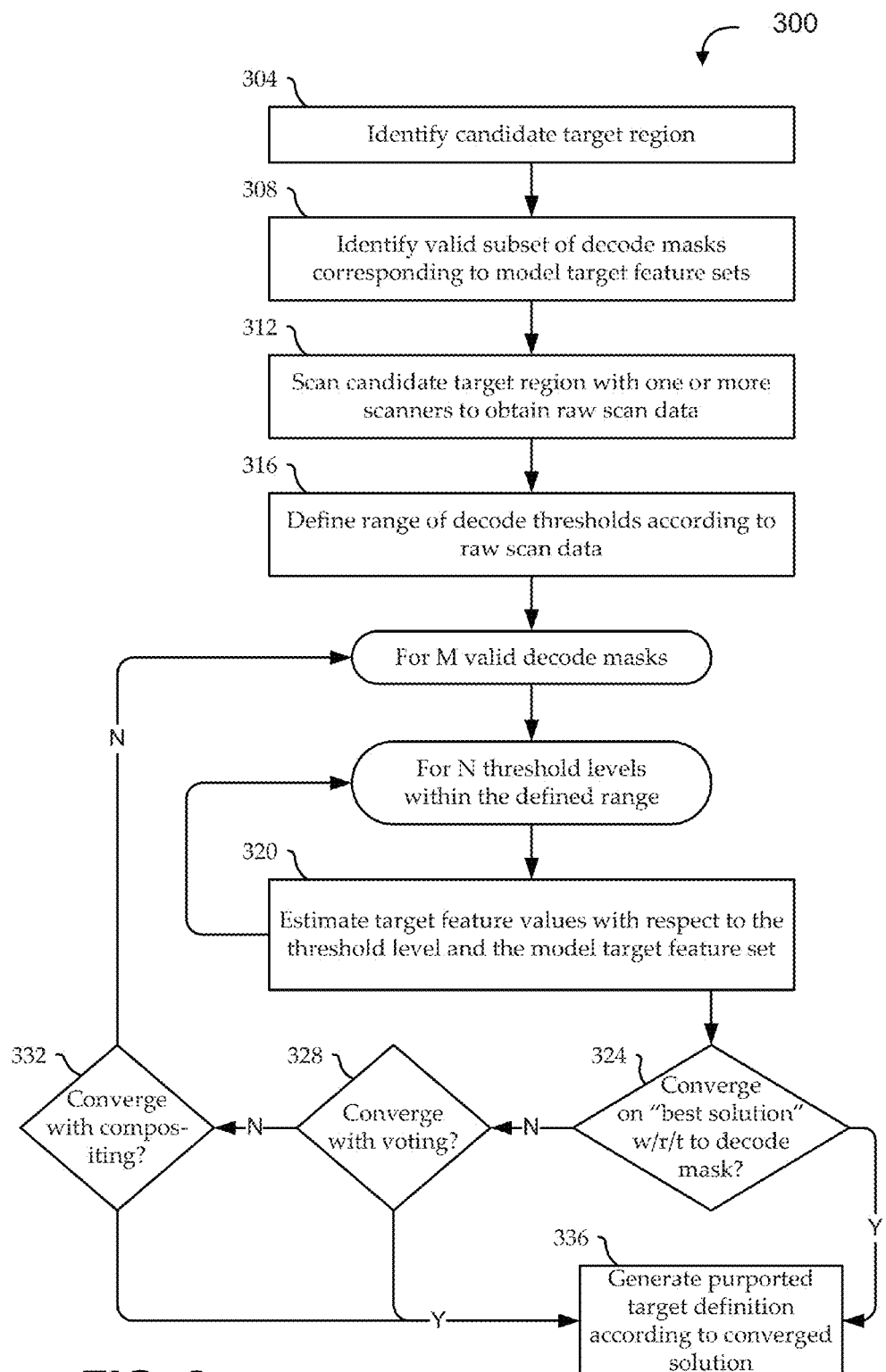
FIG. 3 shows a flow diagram of an illustrative method for decoding target feature sets, according to various embodiments.

FIG. 3 shows a flow diagram of an illustrative method 300 for decoding target feature sets, according to various embodiments. Embodiments of the method 300 begin at stage 304 by identifying a candidate region to scan for targets. For example, in a storage library, a central processor of the library, a host application, or another computational environment can instruct the robotic mechanism to locate a media cartridge, identify a media cartridge, verify the robotic mechanism position, or perform some other task. Performance of the task can involve scanning a corresponding region to look for and/or verify a particular target feature set. At stage 308, embodiments identify a valid set of decode masks corresponding to model target feature sets. In some implementations, the valid set of decode masks is determined according to the candidate scan region. For example, the scan region can be expected to include a positive or negative magazine target, a geometric feature on a media drive, a barcode, etc., and the valid set of decode masks can be selected accordingly. In one implementation, the candidate scan region is expected to include a particular type of magazine target (e.g., a single, three-dimensional positive geometric target), and the valid set of decode masks is the single decode mask corresponding to the expected magazine target type. In another implementation, it is uncertain which type of target feature set will be encountered, and a valid set of decode masks is selected according to the set of valid target options that could be encountered.

As used herein, decode masks generally refer to a set of values that define features of a predefined target type. For example, a decode mask can be a matrix of values defining amplitudes (bright/dark) and widths (inches) of various patterns expected in a target design. A pattern can consist of segments of alternating signal amplitudes (e.g., a bright segment is followed by a dark segment, and so on) until a complete scan is achieved. For example, a particular target type can be characterized by a "0.100-inch width sector of brightness above 1 volt," or a "0.100-inch width sector of brightness 1 volt, followed by a 0.200-inch width sector above 1 volt." Each sector can be defined by any suitable number and type of parameters. For example, each sector can have width and brightness parameters defined by a nominal value, valid minimum and maximum values, etc. An example of a simple decode mask is as follows:

| {1 | 0 | 1 | 0 | 0} |
|---|---|---|---|---|
| {5 | 200 | 5 | 0 | 0} |
| {2000 | 250 | 2000 | 0 | 0} |

The first row of the decode mask can represent bright and dim properties. The second and third rows of the decode mask can represent minimum and maximum width values, respectively. Accordingly, the decode mask can represent a target having a first bright sector of width between 5 and 2000 mils, followed by a second dark sector of width between 200 and 250 mils, followed by a third bright sector of width between 5 and 2000 mils. Different decode masks can have different numbers of sectors, different numbers and/or types of parameters, etc. For example, more complex decode masks can use multiple entries to define changes over distance (e.g., ramps, curves, etc.), nominal values, etc.

At stage 312, the candidate scan region is scanned using one or more scanners to acquire raw scan data. As described above, the raw scan data can be an analog signal that represents levels detected by the scanner at various positions within the candidate region. For example, the raw scan data can be an analog voltage signal corresponding to an amount of light received by the scanner after reflection or scattering from objects in the scan region, so that the voltage signal represents topographic and/or contrast information for objects in the scan region.

Figure 4:
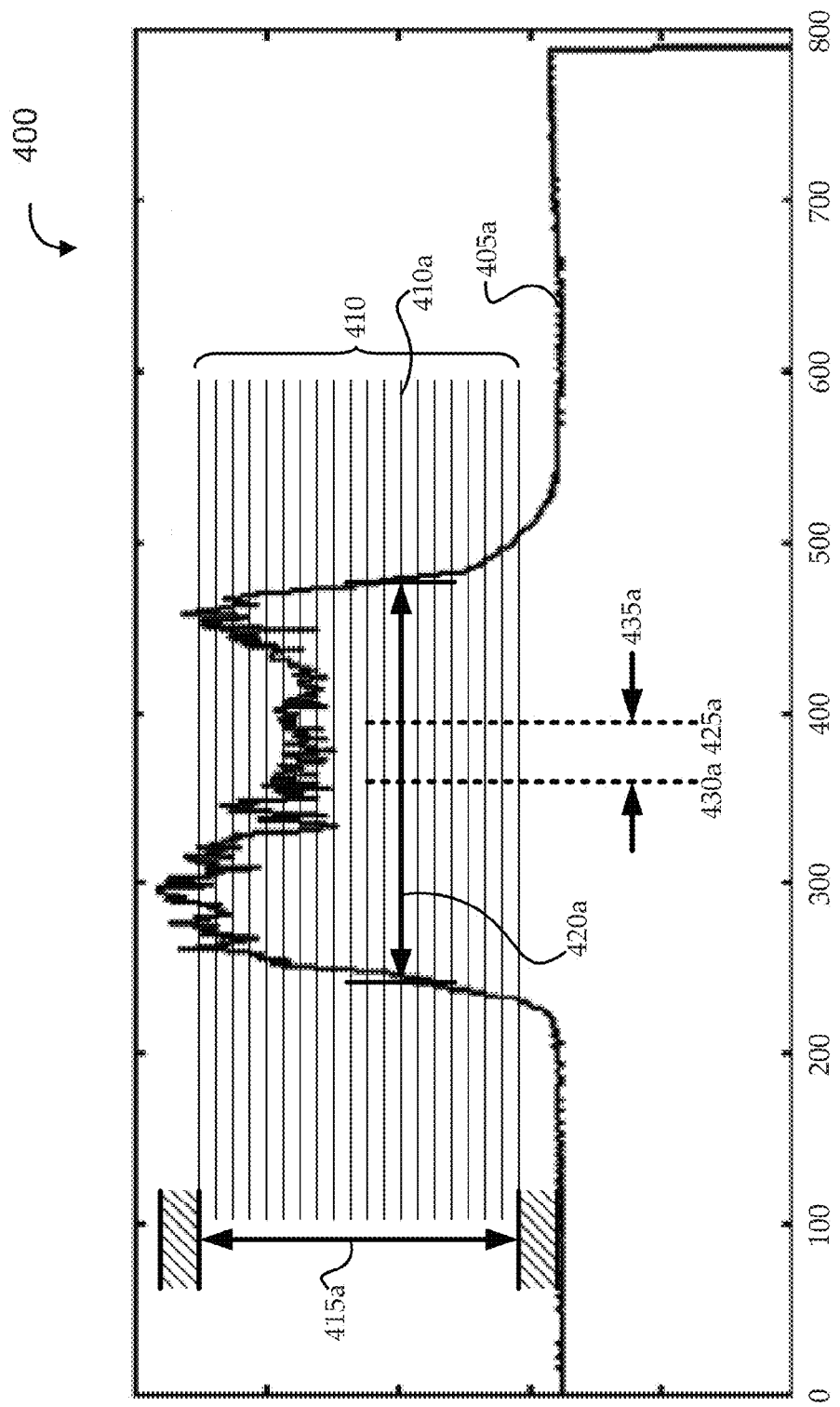
FIG. 4 shows an illustrative scanner output having raw scan data for a positive geometric target.
Figure 5:
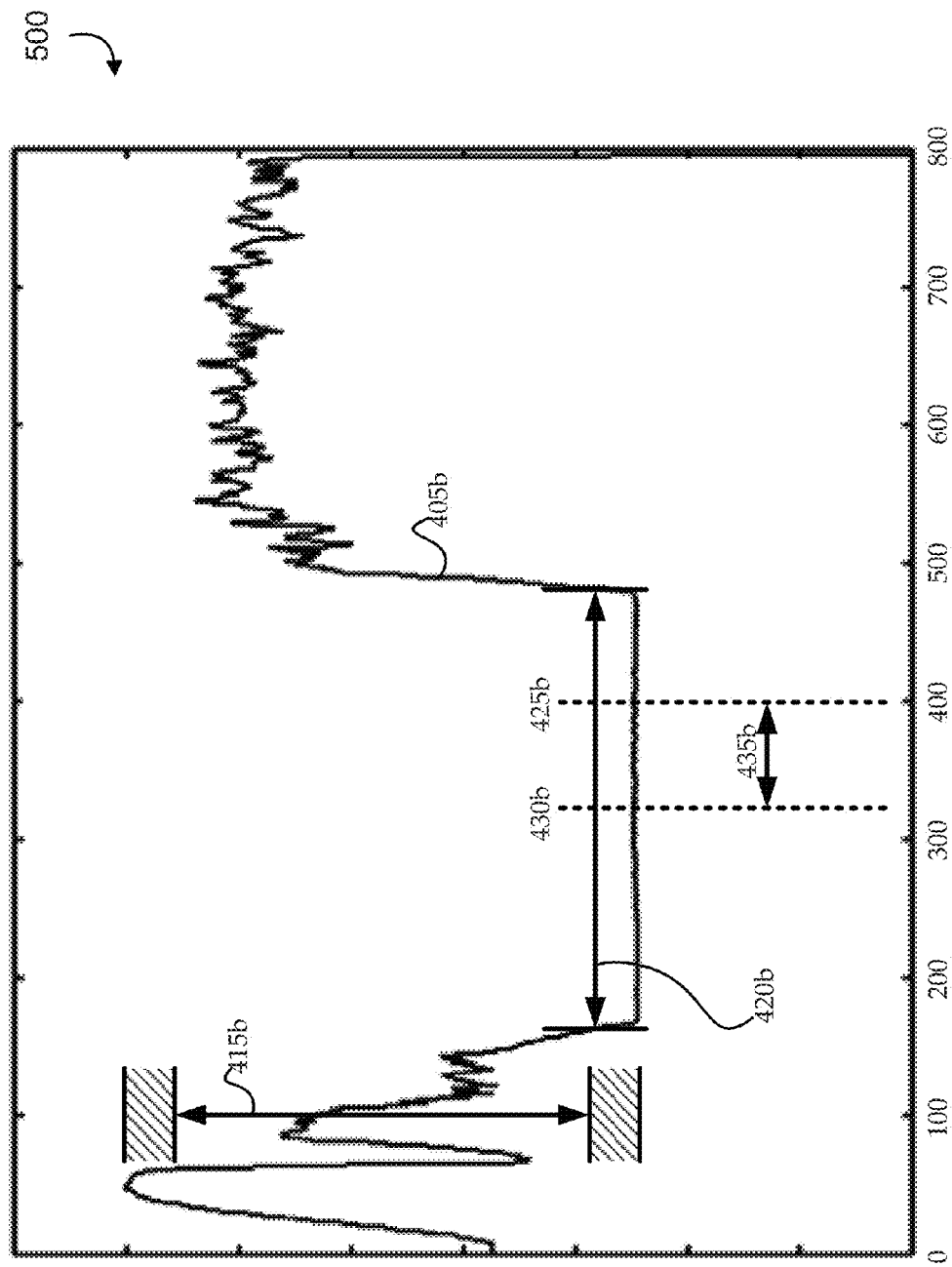
FIG. 5 shows an illustrative scanner output having raw scan data for a negative geometric target.

For the sake of added clarity, the remaining stages of the method 300 are described in context of FIGS. 4 and 5. FIG. 4 shows an illustrative scanner output 400 having raw scan data 405 for a positive geometric target. As illustrated, the scan window is approximately 800 samples wide and includes scanned voltage levels across the scan window representing one illustrative three-dimensional positive geometric target. FIG. 5 shows an illustrative scanner output 500 having raw scan data 405*b* for a negative geometric target. As illustrated, the scan window is approximately 800 samples wide and includes scanned voltage levels across the scan window representing one illustrative three-dimensional negative geometric target. As described below, the raw scan data 405 can be decoded to generate a purported target definition according to iterative stages of the method 300. For example, the raw scan data can be decoded at each of a number of threshold levels 410 (e.g., amplitude levels, X-axis levels, etc.) to generate a number of solutions, and those solutions can be used to converge on a purported target definition.

At stage 316, some embodiments define a range of decode threshold levels according to the raw scan data. In some implementations, minimum and maximum levels can be determined from the raw scan data 405 and used to determine a valid decode range. For example, as illustrated in FIG. 4, the valid decode range 415*a* can be determined as a range between the minimum and maximum levels of the raw scan data 405*a* ignoring uppermost and lowermost regions (e.g., ten percent from the maximum and ten percent from the minimum) of the data. Any suitable range can be used. Within the determined decode range 415*a*, a number of decode threshold levels 410 can be determined. For example, the decode range 415*a* can be evenly divided into a predetermined number of decode threshold levels 410, decode threshold levels 410 can be separated by a predetermined change in amplitude, or decode threshold levels 410 can be set in any other suitable manner. As illustrated in FIG. 3, stages of the method 300 can iterate for each of N decode threshold levels 410 and, when applicable, for each of a set of M candidate decode masks.

At stage 320, embodiments (e.g., or the decode module 220 implemented by the processor 210) determine estimated feature values at the particular decode threshold level corresponding to each of a set of candidate target features defined by the particular candidate decode mask. For example, the illustrative target of FIG. 4 manifests in the scan data 405*a* as a LOW-HIGH-LOW pattern, and the illustrative target of FIG. 5 manifests in the scan data 405*b* as a HIGH-LOW-HIGH pattern. Each corresponding candidate decode mask can define a set of candidate target features, such as an expected target width (e.g., a nominal target width and a range of valid target widths for that target type). Other features can be explicitly or implicitly defined by the decode mask. For example, implementations may assume that the expected center of the target is in the center of the scan window unless otherwise specified by the decode mask. As illustrated in FIG. 4, at a particular one of the decode threshold levels 410*a*, sample locations at which the raw scan data 405*a* crosses the decode threshold level 410*a* can be used to determine an estimated target width and offset corresponding to that decode threshold level 410*a*. The estimated target width is illustrated as the distance 420*a* between a low-to-high transition and a high-to-low transition with respect to the decode threshold level 410*a*. An expected target center is shown as dashed line 425*a* (e.g., assumed to be the center of the scan window), and an estimated target center can be determined as the center of the estimated target width at the decode threshold level 410*a*, illustrated as dashed line 430*a*. A target offset can then be determined as a distance 435*a* between the expected and estimated target centers with respect to the decode threshold level 410*a*.

For example, in FIG. 4, the decode threshold level 410*a* is at approximately "2" on the Y-axis (e.g., representing a 2-volt scanner response). The raw scan data 405*a* crosses the decode threshold level 410*a* at two distinct points, near 230 samples and 480 samples. Data points on the raw scan data 405*a* curve with readings above the decode threshold level 410*a* are deemed "high" or "bright," and those below the decode threshold level 410*a* are deemed "low" or "dark." As described above, the estimated target width can be calculated as the distance 420*a* between the low-to-high transition and the high-to-low transition with respect to the decode threshold level 410*a* (e.g., target width=480−250=230 samples). The estimated target center can be calculated as the center of the target width with respect to the decode threshold level 410*a* (e.g., target center=480−(230/2)=365 samples; or target center=250+(230/2)=365 samples). In some implementations, the expected center of the target can be calculated as the center of the scan window (e.g., expected target center=(800−0)/2=400 samples). The estimated target offset can be calculated as the distance 435*a* between the expected and estimated target centers with respect to the decode threshold level 410*a* (e.g., target offset=400−365=35 samples to the left). While these values are being calculated in "samples" (e.g., scanner or oscilloscope samples), the same calculations can be made in or converted to inches or any other suitable unit. For example, if the oscilloscope takes 2500 samples per second, and the scanner travels at 1.58 inches per second, the target width can be calculated as 230 samples/2500 samples/second×1.58 inches/second=0.145 inches (or 145 mils) wide; and the target offset can be calculated as 35 samples/2500 samples/second×1.58 inches/second=0.0221 inches (or 22.1 mils) of offset. It will be appreciated that many other target feature values can be estimated from the scan data 405*a*, and that different types of scan data and/or scan results can facilitate estimating different types of target feature values.

Embodiments iteratively perform stage 320 for each of the decode threshold levels 410. It can be seen in FIG. 4 that different values for the target width and offset will be estimated at different decode threshold levels 410. Embodiments of the method 300 use the various target feature values estimated at different decode threshold levels 410 to generate a purported target definition for one or more targets in the candidate region. At stage 324, an attempt can be made to converge on (or otherwise generate) a valid "best solution" from some or all of the estimated target feature values. For example, the decode threshold level 410 yielding the estimate target width closest to the expected values according to the decode mask can be used as the best solution. In other implementations, values can be weighted, interpolated, or otherwise processed to generate the best solution from the estimated feature values. If a valid solution can be achieved, a purported target definition of a target having corresponding features (e.g., a corresponding or nominal target width at a corresponding offset) can be generated at stage 336. Embodiments can use the purported target definition in any suitable manner, for example, for target validation or identification, robot mechanism positioning, etc.

In some embodiments, if a best solution cannot be achieved from (e.g., no valid solution or multiple valid solutions can be found in) the estimated feature values, a voting process can be applied at stage 328. The voting process can attempt to select and/or generate a best solution from among multiple valid potential solutions, and is described more fully below. If a valid solution can be achieved from voting at stage 328, a purported target definition of a target having corresponding features can be generated at stage 336. In some embodiments, if a best solution cannot be achieved from the estimated feature values by stage 324 and/or by stage 328, a compositing process can be applied at stage 332. The compositing process can use composite decode masks to attempt to select and/or generate a best solution in context of known errors or artifacts (e.g., scratches, smudges, manufacturing artifacts, etc.), and is described more fully below. If a valid solution can be achieved from compositing at stage 332, a purported target definition of a target having corresponding features can be generated at stage 336. In some embodiments, if a best solution still cannot be achieved the method can end, output an error or other log event, or respond in other such manners. In other embodiments, the same scan data can be decoded using one or more different decode masks to determine whether a different type of target is present in the scan window. For example, if a type of positive geometric target cannot be found in the scan window, the decoding can look for another type of positive geometric target (e.g., of a different width or profile), a negative geometric target, etc. Various techniques for decoding the raw scan data are described more fully with reference to various illustrative scan results.

FIGS. 6A and 6B show partial decode results from an illustrative decode module for the positive geometric target shown in FIG. 3, according to various embodiments. The decode results are intended to add clarity and enabling disclosure and are not intended to limit the scope of embodiments to a particular implementations. Turning first to FIG. 6A, the first line shows that a particular decode mask is selected corresponding to a "Normal" "Magazine" target type. As used in this example, that target type indicates a positive geometric target of the type found on a magazine in a particular storage library when the target has no abnormalities (e.g., scratches, etc.). Each subsequent line corresponds to a decode attempt at a particular decode threshold value (e.g., starting from the bottom of the range and moving in an upward direction). It can be seen from FIG. 3 that the scan data shows relatively discrete and expected transitions at the lower decode threshold levels (e.g., the data crosses each decode threshold line exactly twice), while the scan data shows relatively unexpected transitions at the higher decode threshold levels (e.g., noise in the data manifests as multiple crossings of the decode threshold lines). Accordingly, the first number of listed decode attempts shows a valid target found with corresponding values at each of those decode threshold levels for an estimated target width and offset. However, at the higher decode threshold levels, the listed decode attempts show "No Target Found" (though certain data can still be collected for auditing, post-analysis, and/or other reasons).

Turning to FIG. 6B, the decode attempts from FIG. 6A can be analyzed into decode results with corresponding estimated target feature values to converge on a valid decode solution. For example, the "Decode 0" line corresponds to the first decode attempt listed in FIG. 6A at which a valid target was found. The first line of FIG. 6B indicates that 95 decode threshold levels were used, 63 potentially valid decode attempts were acquired (e.g., decode attempts at which the transition values were within valid ranges according to the decode mask), and the best values are found in decode number 37. There is also information referring to "groups," as will be described below. In this example, the "best" decode result is determined as the result closest to a predetermined nominal target width (150 mils in this example). That result corresponds to Decode 37, which has a decode threshold level of 2.059 volts and yields an estimated target width of 149.73 mils and an estimated target offset of −20 mils (or 20 mils to the left).

Figure 7:
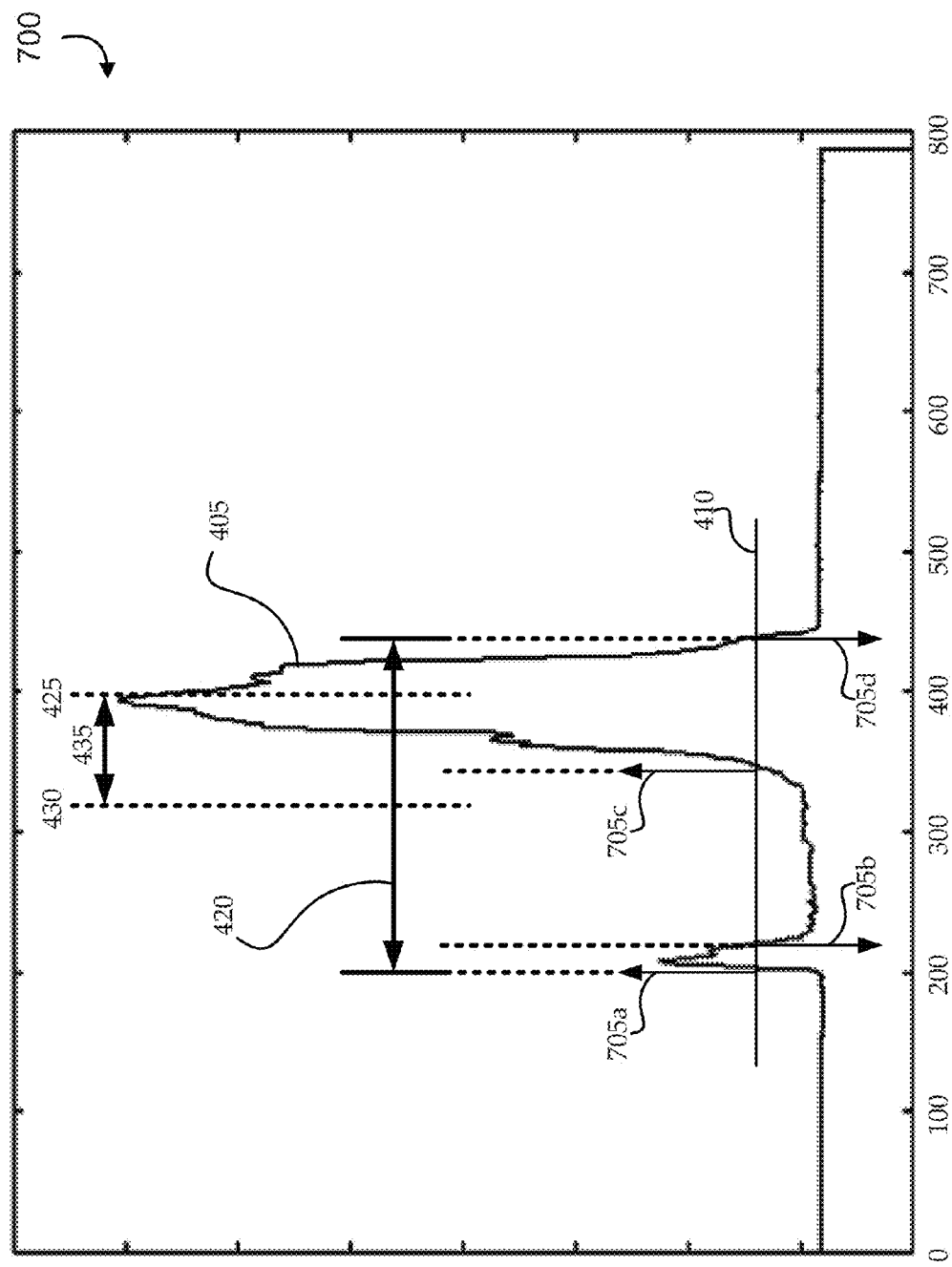
FIG. 7 shows an illustrative scanner output having raw scan data for a positive geometric target with a drop out.

FIG. 7 shows an illustrative scanner output 700 having raw scan data 405 for a positive geometric target with a drop out. As illustrated, the scan window is approximately 800 samples wide and includes scanned voltage levels across the scan window representing one illustrative three-dimensional positive geometric target having a scratch, smudge, or other artifact that causes a drop out in the scan data. Embodiments address the drop out by using a composite decode mask. For example, the composite decode mask allows for a "low" segment between two "high" segments, where the three segments combine to form a composite width that falls within a valid range of or matches the nominal desired "high" width of the corresponding target without the drop out (e.g., had the target not been scratched).

| {L | 1 | 4} | | | | | |
|---|---|---|---|---|---|---|---|
| {20 | 10 | 10 | 10 | 20 | 0 | 0 | 0} |
| {150 | 130 | 200} | | | | | |
| {2000 | 180 | 180 | 180 | 2000 | 0 | 0 | 0} |

The first row of the decode mask can provide the overall composite format, for example representing that there is a "low" sector ("L") as the first sector, and the composite width is determined as the width between transitions "1" and "4" (e.g., it is assumed that each sector will alternate between low and high, so that this effectively defines a profile of at least low-high-low-high-low). The second and fourth rows of the decode mask can represent minimum and maximum width values for each sector, respectively. The third row of the decode mask can represent composite width values, such as a nominal, minimum, and maximum composite width for the target type. Accordingly, the decode mask can represent a target having a first dark sector of width between 20 and 2000 mils, followed by a second bright sector of width between 10 and 180 mils, followed by a third dim sector of width between 10 and 180 mils, followed by a fourth bright sector of width between 10 and 180 mils, followed by a fifth dim sector of width between 20 and 2000 mils. The decode mask further represents that the second, third, and fourth sectors should form a composite width of between 130 and 200 mils (nominally 150 mils).

As illustrated, the scan data 405 includes four transitions 705 with respect to decode threshold level 410 (only one decode threshold level 410 is shown to avoid overcomplicating the figure). Applying the decode mask above, it is desired for transition 705a to begin somewhere between 20 and 2000 mils from the left side of the scan window, for the distance between transitions 705a and 705b to be between 10 and 180 mils, for the distance between transitions 705b and 705c to be between 10 and 180 mils, for the distance between transitions 705c and 705d to be between 10 and 180 mils, and for the distance between transition 705d and the right side of the scan window to be between 20 and 2000 mils. Further, it is desired for the distance between transitions 705a and 705d (i.e., the estimated composite target width, as indicated by arrow 420) to be between 130 and 200 mils. For example, the transitions 705 with respect to decode threshold level 410 are at approximately 200, 220, 350, and 440 samples, respectively; so that the five sectors of interest in the decode mask have respective widths of approximately 200, 20, 130, 90, and 360 samples, respectively. Further, the composite width 420 is approximately 440−200, or 240 samples. As described above, given particular scanner settings, these values can be converted to inches as 240 samples/2500 samples/second×1.58 inches/second=0.15168 inches (or approximately 151.7 mils), which is close to the nominal target width defined in the decode mask. A purported target definition can be generated from this data that assumes a single, three-dimensional positive geometric target. As described above, an estimated target offset can also be calculated at each decode threshold level. For example, at decode threshold level 410, the offset can be calculated as the difference between an expected target center (e.g., the center of the scan window, or 400 samples) and the center of the estimated target width (e.g., 440−(240/2)=320 samples), or approximately 400−320=80 samples of offset. Again, inches of offset can be calculated as 80 samples/2500 samples/second×1.58 inches/second=0.05056 inches (or 50.6 mils) of offset.

Figure 8:
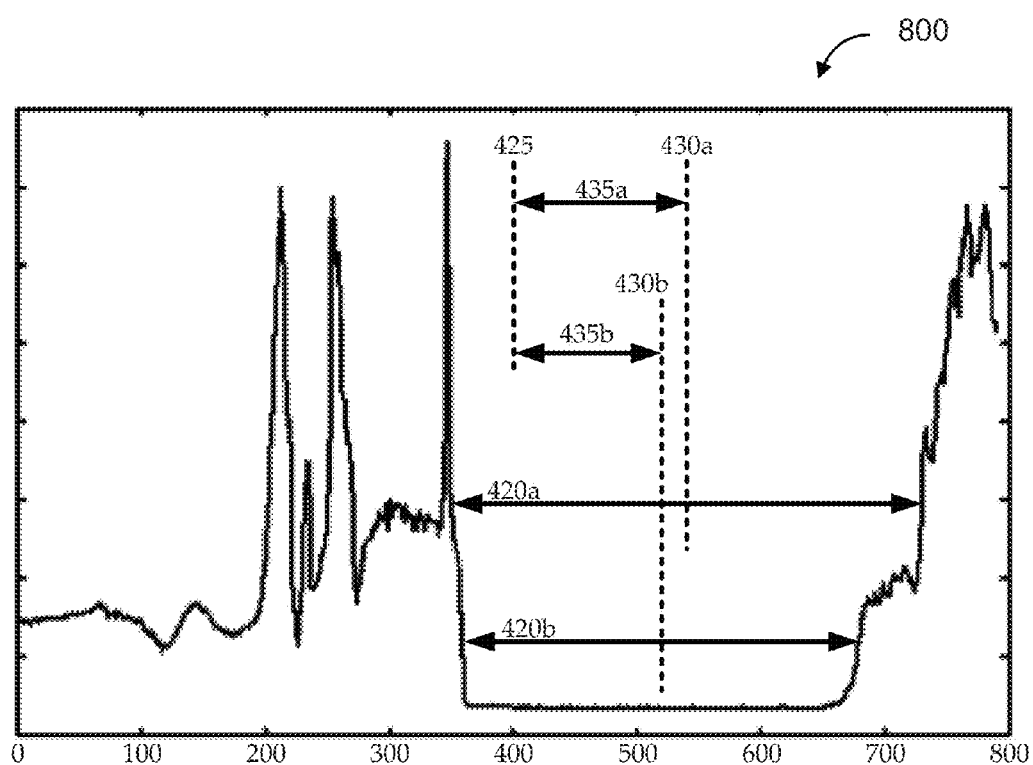
FIG. 8 shows an illustrative scanner output having raw scan data for a negative geometric target with two potentially valid solutions.

FIG. 8 shows an illustrative scanner output 800 having raw scan data 405 for a negative geometric target with two potentially valid solutions. As illustrated, the scan window is approximately 800 samples wide and includes scanned voltage levels across the scan window representing one illustrative three-dimensional negative geometric target (e.g., a hole) having one region suggesting a first target width and offset and a second region suggesting a second target width and offset. Embodiments segregate the potentially valid solutions into groups and vote for the group having the most likely valid solution before generating a purported target definition from the decode results. For example, a first group of valid potential target widths calculated by one set of decode threshold levels (or in one sector, as described below) can be outweighed by a "better" (e.g., larger) group of widths calculated for another set of decode threshold levels (or in another sector). Some implementations look for a discontinuity in the decode results (e.g., discontinuity in the calculated target offsets, discontinuity in calculated target widths, etc.) or another indication that multiple groupings of results may be appropriate.

As illustrated, a first decode threshold level yields a first estimated target width 420a and corresponding first estimated target offset 435a; and a second decode threshold level yields a second estimated target width 420b and corresponding second estimated target offset 435b (both offsets with reference to an expected target center 425). For the sake of clarity, partial sample decode results are shown in FIG. 9. As shows, the decode results indicate that two groups were formed with the first group having 64 of the decode results and the second group having 29 of the decode results. Each decode results indicates its respective group (e.g., as "OffsetGroupNum="). As shown, the first group of decode results indicate an estimated target width of between around 174 and 216 mils with estimated target offsets of between around 74 and 84 mils, while the second group of decode results indicate an estimated target width of between around 216 and 239 mils with estimated target offsets of between around 85 and 90 mils. In the example, the first group is identified as the "better" group (e.g., because it has more associated decode results). Within the first group, decode result 35 is identified as the "best" result, as it indicates a target width (200.03 mils) that is closest to a predefined nominal width of 200 mils for that target type.

Figure 10:
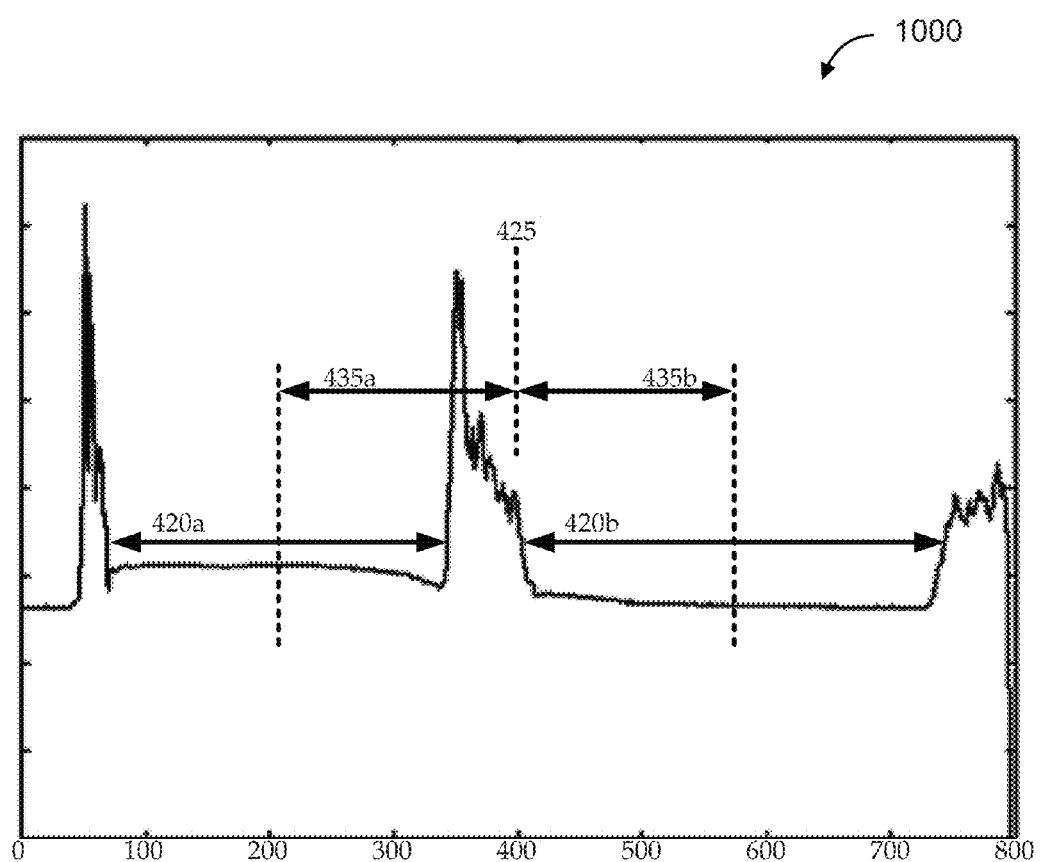
FIG. 10 shows an illustrative scanner output having raw scan data for a negative geometric target being shadowed by a false target.

FIG. 10 shows an illustrative scanner output 1000 having raw scan data for a negative geometric target being shadowed by a false target. As illustrated, the scan window is approximately 800 samples wide and includes scanned voltage levels across the scan window representing one illustrative three-dimensional negative geometric target (e.g., a hole) and another artifact (e.g., smudge, dent, etc.) that manifests as similar to a negative geometric target. One approach, as described with reference to FIGS. 8 and 9, is to find multiple potentially valid target results at some decode threshold levels, group the results, and vote for the best result in the best group. For example, one set of potentially valid decode solutions could correspond to estimated target width 420a and estimated target offset 435a, and another set of potentially valid decode solutions could correspond to estimated target width 420b and estimated target offset 435b. The widely varying offset values can indicate two groups of solutions, and voting can be used to determine the most likely valid target.

However, some techniques can be frustrated by shadowing, or the like. For example, if the left apparent target in FIG. 10 is not an actual target, its features can block the right actual target from being decoded. For the sake of illustration, in an implementation in which the decode mask is looking for a certain number of transitions, the false set of target features can effectively fill those spots in the decode mask and generate an invalid decode result, while the actual target features are effectively ignored. Accordingly, some implementations use a particular type of decode mask that sorts out false-images to correctly find the "best" of multiple decoded solutions. For example, the decode mask can define multiple sectors to allow for multiple potential solutions at each decode threshold level, and voting can be used to determine which solution to use in generating the purported target definition. Such an illustrative decode mask for a result like FIG. 10 is as follows:

| {H | 3 | 4} | | | | | |
|---|---|---|---|---|---|---|---|
| {20 | 80 | 20 | 160 | 20 | 0 | 0 | 0} |
| {200 | 160 | 240} | | | | | |
| {2000 | 240 | 2000 | 240 | 2000 | 0 | 0 | 0} |

The first row of the decode mask can provide the overall format, for example representing that there is a "high" sector ("H") as the first sector, and width between "3" and "4" should not be included in any target width determination. This effectively defines that a first high-low-high set of target features is followed by a second high-low-high set of target features. The second and fourth rows of the decode mask can represent minimum and maximum width values for each sector, respectively. The third row of the decode mask can represent nominal, minimum, and maximum width values, respectively, for the target type. Accordingly, the decode mask can represent a target having a first bright sector of width between 20 and 2000 mils, followed by a second dark sector of width between 80 and 240 mils, followed by a third bright sector of width between 20 and 2000 mils, followed by a fourth dark sector of width between 160 and 240 mils, followed by a fifth dark sector of width between 20 and 2000 mils. Notably, the first dark sector has a much larger tolerance (between 80 and 240 mils) than does the second dark sector (with a tolerance of between 160 and 240 mils), for example, to account for more variance in the false target than in the actual target.

Figure 11:
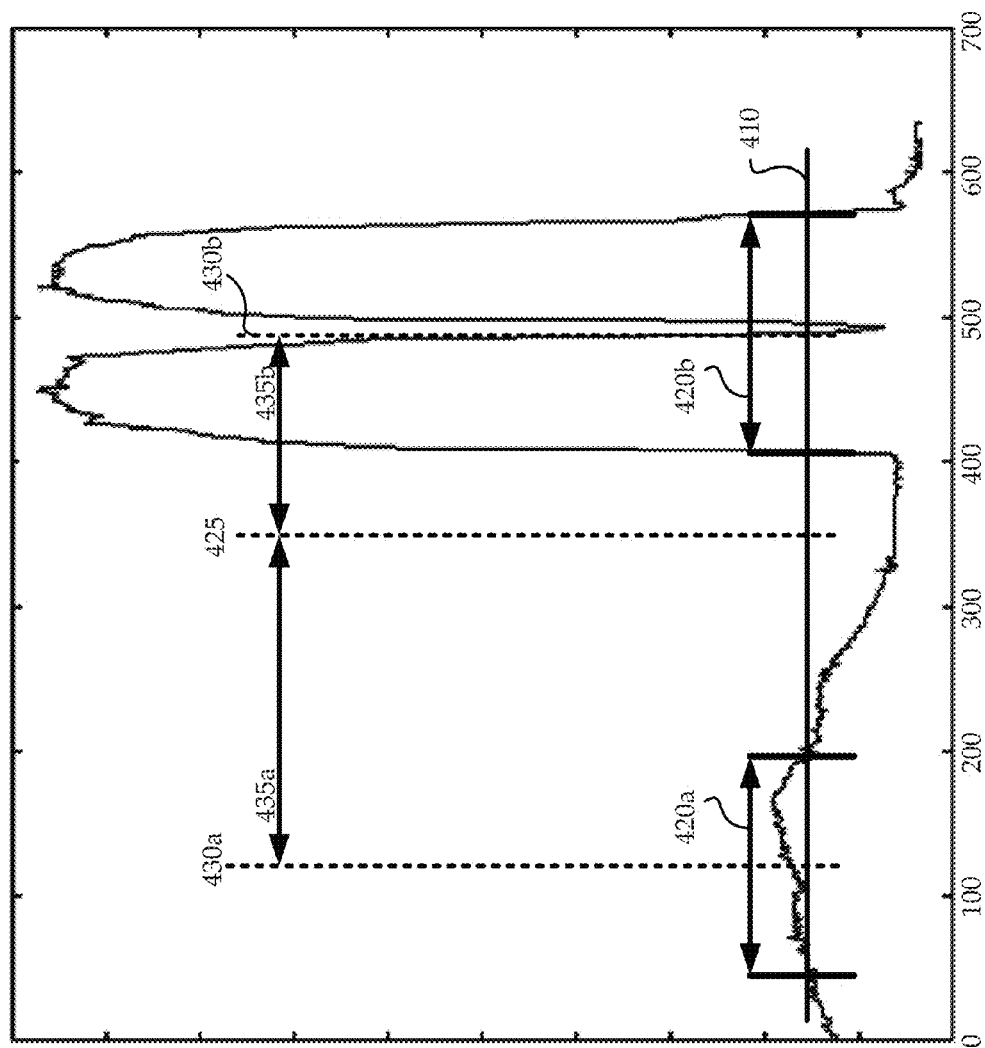
FIG. 11 shows an illustrative scanner output having raw scan data for a positive geometric target having a drop out and being shadowed by a false target.

FIG. 11 shows an illustrative scanner output 1100 having raw scan data for a positive geometric target having a drop out and being shadowed by a false target. As illustrated, the scan window is approximately 700 samples wide and includes scanned voltage levels across the scan window representing one illustrative three-dimensional positive geometric target with a drop out and another artifact that manifests as similar to a positive geometric target. As described above, compositing can be used to handle the drop out. However, shadowing of the actual target on the right side of the scan window by the artifact on the left side of the scan window can frustrate certain compositing. Further, it is assumed that a dedicated decode mask has not been generated for this case (e.g., as described with reference to FIG. 10). It is noted that references to "left" and "right" are intended to be contextual with respect to a scan direction and/or a decode direction. For example, when the decode direction is left to right, the left portion of the scan window can "shadow" the right portion of the scan window; while, when the decode direction is right to left, the right portion of the scan window can "shadow" the left portion of the scan window. Similar contextual changes can be made for other decode and/or scan directions, multiple decode and/or scan directions, etc.

To illustrate an approach of certain embodiments, FIG. 12 shows a partial set of decode results for the scan data of FIG. 11, in which multiple potential target feature sets can be identified at each decode threshold level, and voting can be used to select the most likely valid target from the target feature sets. As shown in FIG. 12, two groups are identified in the scan data of FIG. 11 having 6 and 60 valid decode results, respectively. At lower decode threshold levels, both the actual target and the artifact manifest valid sets of target features. For example, at a decode threshold level of 2.227 volts, a "group 1" target is identified (from the artifact) having a width of 87.53 mils and an offset of −120 mils, and a "group 2" target is identified (from the actual target) having a width of 109.65 mils and an offset of 108 mils. In the example, the decode process votes for "group 2," and decode 62 (at 2.393 volts) is determined to provide the best solution having an estimated target width of 98.28 mils and an offset of 108 mils. As described above, the widely varying offset values can indicate to the decode process that two groups of solutions are present, and voting can be used to determine the most likely valid target.

While embodiments are described above as having a static decode mask, some implementations adjust the decode mask values in successive iterations in an attempt to yield a highest number of valid solutions. For example, the minimum and/or maximum values can be adjusted to increase or decrease tolerances on various portions of the feature set. Other adjustments can additionally or alternatively be made in iterations. For example, the spacing between decode threshold levels (e.g., the decode resolution) can be changed, the number of decode mask sectors and/or sector dimensions can be changed, etc. Further, the decode masks can use additional or alternative types of values, such as a "variance property" describing the electrical voltage variance over a sector (e.g., indicating a surface texture or color of a portion of a target), a "transition property" describing an up or down change in brightness volts or a rate-of change of a brightness parameter (e.g., it is desired to have a slow transition from dim to bright whereby a 0.050-inch width parameter is used to define a transition from a low brightness level to a high brightness level), etc.

Further, while embodiments are described above primarily with reference to topographic types of targets (e.g., positive and negative three-dimensional geometric targets), similar techniques can be applied to decoding of contrast-types of targets (e.g., barcodes and other machine-readable contrast patterns). Contrast-type of targets can be scanned in such a way that the scan data (raw or pre-processed, as described below) is effectively a set of target features. For example, a bar code can be modeled according to a decode mask that defines a set of sectors, and the decode mask can be used to decode the set of target features substantially as described above. Some implementations involve digital filtering, data shift operations, threshold derivation, min/max width interpretation, and/or other techniques for contrast target feature set decoding.

For the sake of illustration, a VCSEL spot sensor can be used to get a voltage response to a physical light/dark pattern from a bar code. The electrical output of the sensor element can be a voltage output from 0 to 3 volts in proportion to the amount of laser light reflected from a label surface back into a photo sensor of the VCSEL. In scanning a bar code label, a typical dark bar can yield a small refection of approximately 1 volt, while a typical white bar will yield a reflection of approximately 2.50 volts. The difference between high and low voltages (e.g., black and white bars) is called the sensitivity or spread. The spread voltage can be affected by variations in laser brightness, photo-sensor lens characteristics, geometric angles, distance from a target, and various label properties (e.g., color contrast, film reflectance, quality, etc.). Scratches, glare, tears, peeling, printing integrity, and other artifacts can also contribute to spread voltage variation and nominal quality of a scan. Some embodiments described herein operate reliably across a large variation in spread voltage (e.g., between 0.05 and 2 volts) and in context of other artifacts and instabilities. Some implementations decode contrast patterns in a manner that facilitates translation into readable codes (e.g., alpha-numeric characters). Other implementations decode contrast patterns in a manner that facilitates collection and analysis of various quality metrics and data associated with the target. For example, it is desirable in some instances to build a database of label statistics for understanding operation and performance of systems using those labels, and for preventing failures in such systems.

In some embodiments, decoding of contrast-types of target feature sets involves pre-processing of the raw scan data into a more easily decodable signal. For example, the raw scan data can be "smoothed" to reduce or eliminate spikes. Center-point smoothing can be used to do this in some implementations. For example, data samples are averaged in blocks and re-written in accordance with the time axis to represent the light and dark label bars (e.g., sometimes called run-time averaging, low-pass filtering, quantizing, etc.). For a typical label, the best block size may be found to be 20 samples. This parameter can be implemented as a variable that can be changed during iterations of a label decode to attempt to suppress spikes. The smoothed signal can be turned into a bar width plot by construction of a threshold voltage line, which can be used to bisect the voltage information into high and low transitions. In some implementations, multiple decode threshold levels can be tried iteratively, as described above. In other implementations, there may be a decode threshold level that can be reliably predetermined for decoding the contrast targets. For example, a 1.5-volt decode threshold level may be selected and may produce reliable results in most or all cases.

Figure 13:
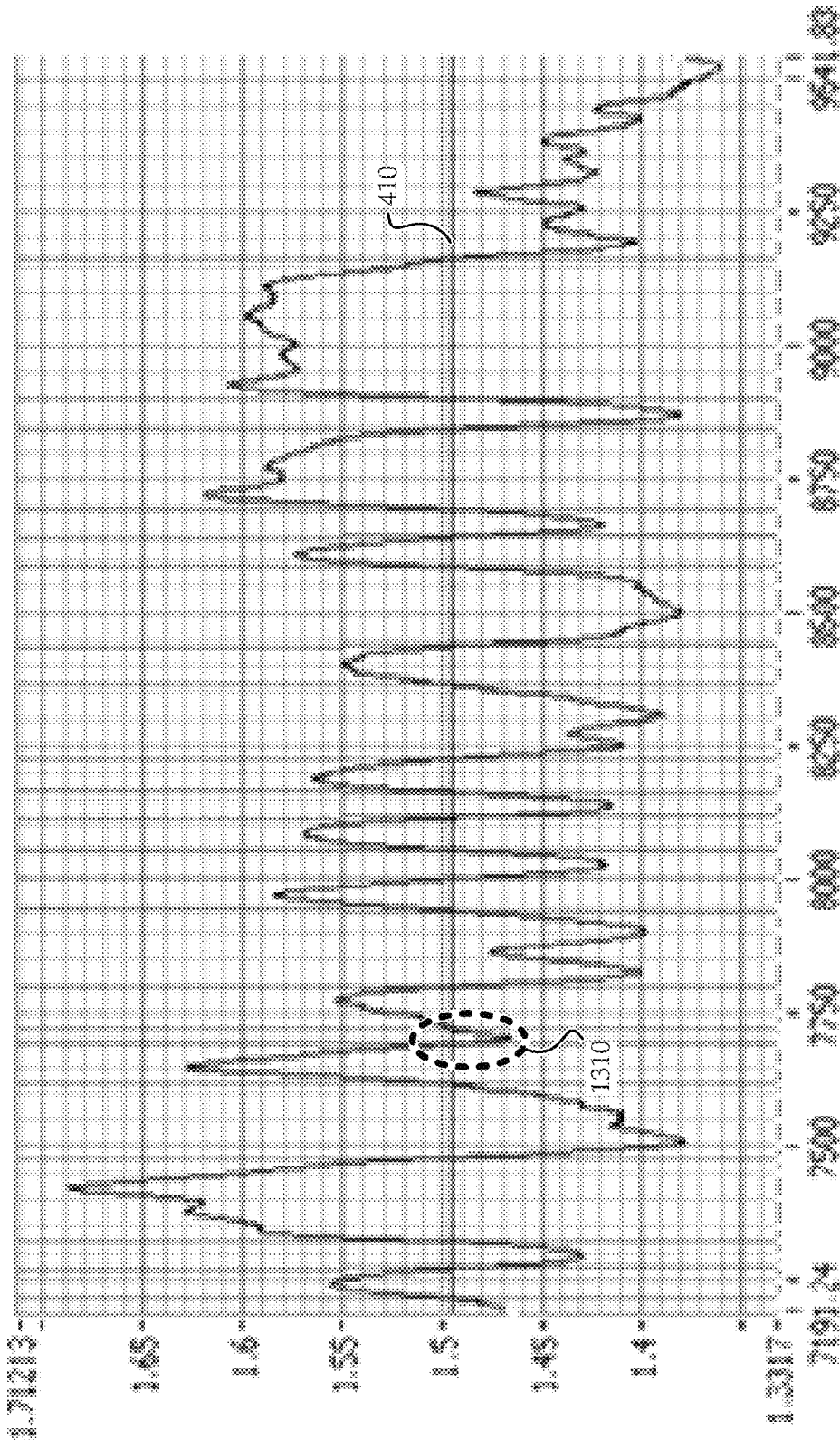
FIG. 13 shows a portion of an illustrative set of scanner data from a contrast-type target after smoothing.

FIG. 13 shows a portion of an illustrative set of scanner data from a contrast-type target after smoothing. A decode threshold level 410 of approximately 1.5 volts is selected to bisect the voltage information into high and low transitions. As shown, at around sample 7700, the data shows a small dip in the voltage signal (e.g., illustrated as region 1310), which may indicate an unwanted drop in voltage from the sensor when signaling a high voltage (e.g., a white bar). The decode threshold level intersects this blip in the data and can cause incorrect interpretation of the bar widths at that position of the scan. In some implementations, various smoothing passes can be iteratively tried to yield improved results. For example, a secondary smoothing pass (e.g., additional low-frequency filtering) with a higher smoothing value may smooth out this bump in the data and yield improved bar width estimation.

Another pre-processing technique involves shifting the scan data (i.e., the voltage data points) about a horizontal normal line to eliminate data points that are appreciably above or appreciably below the other points (e.g., to remove outliers). For example, high-pass filtering can be used to center the scan data about a threshold voltage to minimize or eliminate cases where high or low voltages have missed transitions. The threshold level can be dynamically set to maximize distances of the scan data from the threshold to effectively normalized the scan data around the threshold (center) voltage. For example, if the data were not normalized, a low voltage (black bar) between two high voltage (white bars) may not drop low enough to qualify as a low voltage. The vertical scale can be rebuilt around threshold level as a new "zero" level, so that the new zero level becomes the threshold by which the high and low transitions (and bar widths) can be calculated.

Having pre-processed the scan data, the data can be decoded to determine the contrast pattern features. For example, decoding of a bar code label scan can determine bar widths and colors. Some embodiments identify the transition locations (e.g., where the scan data signal crosses the threshold line) to yield values (e.g., as time stamps, oscilloscope samples, or the like), where a bright or dark transition occurs. The value can be converted into any suitable unit, such as time, distance, width, etc. In some implementations, an average of all bar widths is calculated, which can set up a qualification size (e.g., a threshold width) for narrow and wide white and black bars. Certain defined code parameters (e.g., standard bar code formats, etc.) can be used to assist in this calculation. For example, any bars above the threshold width can be deemed "wide," and any bars below the threshold width can be deemed "narrow." Some implementations construct a table to assign brightness properties to width properties. The table can be constructed by sequencing through the data samples, reading the width of each block, and calculating a voltage average of the samples in the block. For example, a resulting table may read:

{W b W b w B W B w b w b ...}, where "W" represents a wide white bar, "w" represents a narrow white bar, "B" represents a wide black bar, and "b" represents a narrow black bar. The resulting table can be further decoded against a known format. For example, a bar code can be further decoded into specific alpha-numeric characters according to the "3 of 9" bar code format.

As described above, in addition to (or instead of) being able to decode the contrast pattern, some embodiments provide information relating to the quality of the contrast pattern (e.g., label quality). Implementations can gather and/or generate contrast pattern statistics during label scanning for later use in determination of label quality and/or system performance. While many typical bar code scanners and the like are based on digital scanning (e.g., charge-coupled devices, or CCDs) it can be difficult or impossible to acquire certain information that is available from analog scanning and decoding. For example, an analog scan result can show, not only whether a particular bar is white or black (e.g., "1" or "0"), but also an absolute or relative brightness level, which can indicate quality information. In some embodiments, voltages of each bar can be tabulated and characterized according to a standard model; and, after a series of calculations, the decode process can output an indication of quality of the label.

One example quality parameter is a variance of voltage spread calculated across an entire label, which can indicate a readability of the label. Comparing the variance against other label scans can determine if there is a potential readability issue (e.g., a glare problem, a problem with scanner angle, etc.). Another example quality parameter is a bar width variance. High bar width variation can indicate sub-standard printing or extra-narrow (small) bars, scratches in a label can manifest as bar width variation, etc. In some implementations, a min/max bar width check can reveal label bars that are close to limits established in a bar width threshold setting. Yet another example quality parameter is paper quality and/or white-black contrast of a label. Voltage signals generated from the sensor, and particularly spread voltage, can be compared to known values for a given label construction, and can indicate such issues as contrast degradation, fading or yellowing of the label, etc. Any of these and/or other quality parameters can be detected using contrast target decoding techniques. Some embodiments include monitoring of these parameters; detection, logging, and/or reporting of corresponding conditions; etc.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for target decoding in a data storage system, the method comprising:
    identifying a candidate target region as including an expected target feature set;
    receiving raw scan data by scanning the candidate target region with a scanner, the raw scan data including a measured level for each of a plurality of sample locations within the candidate target region;
    determining, for each of a plurality of decode threshold levels, an estimated feature value corresponding to each of a set of candidate target features defined by a candidate decode mask;
    identifying at least two groups of the decode levels as each representing a valid potential set of candidate target features according to the candidate decode mask;
    voting for one of the at least two groups of decode threshold levels as representing a most valid potential set of candidate target features;
    generating a purported target definition by calculating a purported feature value for each of the set of candidate target features as a function of the estimated feature values determined with respect to at least some of the plurality of decode threshold levels, the purported target definition generated from one of the decode threshold levels of the voted-for group of decode threshold levels that has at least one respective estimated feature value that is closest to a corresponding nominal feature value defined by the candidate decode mask; and
    determining whether at least a portion of the expected target feature set is physically present in the candidate target region according to the purported target definition.

2. The method of claim 1, wherein:
    generating the purported target definition comprises selecting one of the decode threshold levels as having at least one respective estimated feature value that is closest to a corresponding nominal feature value defined by the candidate decode mask.

3. The method of claim 1, further comprising:
    determining whether a threshold number of decode threshold levels represent valid potential sets of candidate target features according to their respective estimated feature values and the candidate decode mask,
    wherein, when at least the threshold number of decode threshold levels represent valid potential sets of candidate target features, the purported target definition is generated according to one of the decode threshold levels selected as having at least one respective estimated feature value that is closest to a corresponding nominal feature value defined by the candidate decode mask, and
    wherein, when fewer than the threshold number of decode threshold levels represent valid potential sets of candidate target features, selecting a different one of a plurality of candidate decode masks as the candidate decode mask, and repeating the determining the estimated feature values and the generating the purported target definition steps according to the selected candidate decode mask.

4. The method of claim 3, wherein the selected candidate decode mask is a composite mask that represents a predefined target feature set having an expected type of error condition.

5. The method of claim 1, further comprising:
    locating a robotic mechanism according to the purported target definition.

6. The method of claim 1, further comprising:
    determining a range of decode threshold values as a function of the raw scan data.

7. The method of claim 1, wherein the set of candidate target features comprises a candidate target dimension and a candidate target offset.

8. The method of claim 1, further comprising:
    selecting the candidate decode mask from a plurality of decode masks each associated with a predefined target feature set.

9. The method of claim 6, wherein the candidate decode mask is selected to match the expected target feature set of the candidate target region.

10. The method of claim 1, wherein the estimated feature values are determined for each of the plurality of decode threshold levels for each of a plurality of candidate decode masks.

11. The method of claim 1, wherein the expected target feature set defines a single three-dimensional target expected to be physically present in the candidate target region.

12. The method of claim 1, wherein the expected target feature set defines a machine-readable feature code implemented as a set of features expected to be physically present in the candidate target region.

13. The method of claim 1, wherein the raw scan data represents at least one of a topographic profile or a contrast profile of the candidate target region.

14. A system for target decoding in a data storage system, the system comprising:
    a scanner that operates to acquire raw scan data indicating a measured level at each of a plurality of sample locations within a candidate target region determined to include an expected target feature set; and
    at least one processor, in communication with the scanner, that operates to:

determine, for each of a plurality of decode threshold levels, an estimated feature value corresponding to each of a set of candidate target features defined by a candidate decode mask;

identify at least two groups of decode threshold levels as each representing a valid potential set of candidate target features according to the candidate decode mask;

vote for one of the at least two groups of decode threshold levels as representing a most valid potential set of candidate target features;

generate a purported target definition by calculating a purported feature value for each of the set of candidate target features as a function of the estimated feature values determined with respect to at least some of the plurality of decode threshold levels, such that the purported target definition is generated from one of the decode threshold levels of the voted-for group of decode threshold levels that has at least one respective estimated feature value that is closest to a corresponding nominal feature value defined by the candidate decode mask; and determine whether at least a portion of the expected target feature set is physically present in the candidate target region according to the purported target definition.

15. The system of claim 14, wherein the scanner operates to acquire the raw scan data by sweeping a zero-dimensional spot scanner across the candidate target region.

16. The system of claim 14, wherein the at least one processor operates to generate the purported target definition by selecting one of the decode threshold levels as having at least one respective estimated feature value that is closest to a corresponding nominal feature value defined by the candidate decode mask.

17. The system of claim 14, wherein the at least one processor further operates to:

determine whether a threshold number of decode threshold levels represent valid potential sets of candidate target features according to their respective estimated feature values and the candidate decode mask, wherein, when at least the threshold number of decode threshold levels represent valid potential sets of candidate target features, the at least one processor operates to generate the purported target definition according to one of the decode threshold levels selected as having at least one respective estimated feature value that is closest to a corresponding nominal feature value defined by the candidate decode mask, and wherein, when fewer than the threshold number of decode threshold levels represent valid potential sets of candidate target features, the at least one processor further operates to select a different one of a plurality of candidate decode masks as the candidate decode mask, and to repeat the determining the estimated feature values and the generating the purported target definition steps according to the selected candidate decode mask.

18. The system of claim 14, further comprising:

a robotic mechanism in communication with the scanner, wherein the at least one processor further operates to locate the robotic mechanism at least according to the purported target definition.

\* \* \* \* \*